(12) United States Patent
Bayona P. et al.

(10) Patent No.: US 12,030,283 B2
(45) Date of Patent: Jul. 9, 2024

(54) FOOD PACKAGING FILM WITH ANTIOXIDANT FOR FRESHNESS PROTECTION

(71) Applicant: Inteplast Group Corporation, Livingston, NJ (US)

(72) Inventors: Rafael E. Bayona P., Morristown, TN (US); Gregory Gillis, Knoxville, TN (US); Kiran J. Soneji, Morristown, TN (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 23 days.

(21) Appl. No.: 16/750,954

(22) Filed: Jan. 23, 2020

(65) Prior Publication Data

US 2020/0230929 A1 Jul. 23, 2020

Related U.S. Application Data

(60) Provisional application No. 62/795,708, filed on Jan. 23, 2019.

(51) Int. Cl.
| | | |
|---|---|---|
| *B32B 27/08* | (2006.01) | |
| *B32B 27/18* | (2006.01) | |
| *B32B 27/32* | (2006.01) | |
| *B65D 81/26* | (2006.01) | |
| *C08K 5/1545* | (2006.01) | |

(52) U.S. Cl.
CPC ............. *B32B 27/08* (2013.01); *B32B 27/18* (2013.01); *B32B 27/32* (2013.01); *B65D 81/266* (2013.01); *B32B 2250/242* (2013.01); *B32B 2307/31* (2013.01); *B32B 2307/74* (2013.01); *B32B 2439/70* (2013.01); *C08K 5/1545* (2013.01); *Y10T 428/1352* (2015.01)

(58) Field of Classification Search
CPC ......... B32B 27/08; B32B 27/18; B32B 27/32; B32B 27/16; B32B 2307/31; B32B 2307/74; B32B 2307/412; B32B 2307/50; B32B 2307/518; B32B 2307/732; B32B 2307/748; B32B 2250/242; B32B 2250/05; B32B 2439/70; C08K 5/1545; C08K 5/1535; B65D 81/266; Y10T 428/1352; C08L 23/14

See application file for complete search history.

(56) References Cited

U.S. PATENT DOCUMENTS

| | | |
|---|---|---|
| 4,880,696 A | 11/1989 | Yanidis |
| 5,562,874 A | 10/1996 | Saad et al. |
| 9,434,138 B2 | 9/2016 | Bayona P. et al. |
| 9,694,564 B2 | 7/2017 | Bayona P. et al. |
| 2014/0008836 A1 | 1/2014 | Guarda et al. |

(Continued)

FOREIGN PATENT DOCUMENTS

| | | |
|---|---|---|
| WO | 2018034644 | 2/2018 |
| WO | 2018034669 | 2/2018 |

*Primary Examiner* — James C Yager
(74) *Attorney, Agent, or Firm* — Stinson LLP

(57) ABSTRACT

A food packaging film comprising a polymer-based core layer having a food-facing side and an exterior-facing side, a food-facing skin layer on the food-facing side of the core layer, and an exterior skin layer on the exterior-facing side of the core layer, wherein the core layer and the food-facing skin layer each contains a natural or synthetic antioxidant, and the film is free of BHA and BHT.

17 Claims, 1 Drawing Sheet

_____ A - Food-Facing Interior Skin Layer

_____ B - Intermediate layer

_____ C - Core layer

_____ D - Intermediate layer

_____ E - Exterior Skin Layer

(56) References Cited

U.S. PATENT DOCUMENTS

| | | | |
|---|---|---|---|
| 2014/0154426 A1 | 6/2014 | Guarda et al. | |
| 2015/0217896 A1* | 8/2015 | Byun | B29C 49/0005 |
| | | | 264/523 |
| 2015/0343751 A1* | 12/2015 | Bayona P. | B32B 27/08 |
| | | | 229/117.27 |
| 2017/0081486 A1* | 3/2017 | Stoll | B29C 48/10 |

* cited by examiner

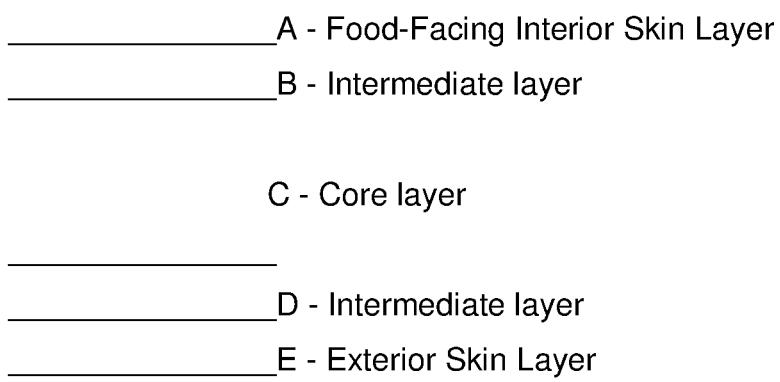

FOOD PACKAGING FILM WITH ANTIOXIDANT FOR FRESHNESS PROTECTION

REFERENCE TO RELATED APPLICATIONS

This application claims priority to U.S. provisional application 62/795,708 filed Jan. 23, 2019, the entire disclosure of which is incorporated herein by reference.

FIELD OF THE INVENTION

The present invention relates to packaging and packaging films for food.

BACKGROUND OF THE INVENTION

Oxidation of packaged food causes the food quality to deteriorate with respect to appearance, aroma, taste, and nutrition, for example, and can eventually turn the food rancid. There have been attempts to stave off these effects by incorporating antioxidants into food packaging.

SUMMARY OF THE INVENTION

Briefly, therefore, the invention is directed to a food packaging film comprising a polymer-based core layer having a food-facing side and an exterior-facing side, a food-facing skin layer on the food-facing side of the core layer, and an exterior skin layer on the exterior-facing side of the core layer, wherein the core layer and the food-facing skin layer each contains a natural or synthetic antioxidant compound, and wherein the film is free of BHA and BHT.

Other objects and features will be in part apparent and in part pointed out hereinafter.

BRIEF DESCRIPTION OF THE FIGURES

FIG. 1 is a schematic illustration of a first embodiment of the film of the invention.

DETAILED DESCRIPTION OF PREFERRED EMBODIMENTS

The present invention is directed to a polymer-based multilayer film for packaging foods that are prone to oxidation. The multilayer film has at least three layers, and may have four, five, or more layers, such as up to nine layers. In one currently preferred embodiment, there are five layers, as depicted in FIG. 1. The required layers are a core layer C, a food-facing interior skin layer A, and an exterior skin layer E. The embodiment in FIG. 1 also includes intermediate layers B and D between the core layer and the skin layers.

The core layer is a biaxially oriented polypropylene (BOPP) film that in one embodiment is a homogeneous polypropylene (HoPP) film. The core layer is a polymer-based layer which comprises at least about 50 wt % polymer, such as at least about 75, 85, or 95 wt % of a polypropylene polymer. In one such embodiment this homopolymer is homopolymer polypropylene having a melt flow index (MFI) between 1.2 to 3.0 g/10 minutes, preferably 1.6 to 2.4 g/10 min.

The core layer comprises one or more antioxidant compounds selected from among natural antioxidant compounds and synthetic antioxidant compounds. Examples of suitable natural antioxidant compounds include, for example, vitamin E (Mixed Tocopherol), Green Tea (Epigallocatechin gallate, Epigallocatechin-3-gallate, Epicatechi-3-gallate), ascorbic acid, fatty acid ester of ascorbic acid, other tocopherols (alpha-tocopherol, gamma-tocopherol, delta-tocopherol in blend), and rosemary oil. Suitable synthetic antioxidant compounds include, for example, vitamin C, vitamin E in the form of ascorbyl palmitate, and a mix of tocopherols mentioned above. The one or more antioxidant compounds are incorporated into the core layer in a total concentration of at least about 1 wt % or at least about 4.5 wt %, such as up to about 16 wt %, such as up to about 8% wt %. A currently preferred embodiment comprises between about 2 and about 4 wt % antioxidant in the core layer. In preferred versions, this antioxidant is vitamin C, or vitamin E, or a combination thereof. An alternative embodiment comprises from 0.8 to 2.3 wt % of a first antioxidant such as vitamin C and from 2 to 4 wt % of a second antioxidant such as vitamin E.

In one embodiment of the present invention, an additive is incorporated into the core layer composition which enhances puncture resistance, generally as discussed in U.S. Pat. No. 9,694,564, the entire disclosure of which is incorporated herein by reference. In one embodiment, at least about 8 wt %, such as between about 8 and about 25 wt %, such as between about 10 and 20 wt % of an elastomer is added to the core layer composition to enhance puncture resistance. The elastomer is a propylene-ethylene copolymer which is compatible with polypropylene and which is also elastic so as to improve puncture resistance. Some elastomers, such as Affinity, EXACT, and the like are based on ethylene with C4, C6 and C8 copolymers and are not compatible with PP and may have a negative effect on puncture impact. In the preferred embodiments, the core layer composition is free of elastomers which are incompatible with PP. For example, the core layer composition is preferably free of elastomers based on ethylene with C4, C6 and C8 copolymers.

In one preferred embodiment, the elastomer is based on propylene, such as a propylene and ethylene copolymer with propylene as the major (>50 wt %) component. For example, the elastomer in one embodiment is a propylene and ethylene copolymer having at least about 70 or 80 wt % propylene, such as between about 80 and 90 wt % propylene, with the balance being ethylene. The copolymer in one preferred embodiment has a density of 0.7 to 1.0 g/cm$^3$, in another embodiment of 0.75 to 0.95 g/cm$^3$, in yet another embodiment of 0.8 to 0.9 g/cm$^3$, and in still yet another embodiment of 0.85 g/cm$^3$. The copolymer may have a melt flow rate of 1 to 30 dg/min, in another embodiment of 2 to 25 dg/min, in yet another embodiment of 2 to 15 dg/min, in still yet another embodiment of 2 to 10 dg/min, in still yet another further embodiment of 2 to 5 dg/min, and in still yet even another further embodiment of 2 dg/min. The copolymer may have a total crystallinity of 1% to 20%, in another embodiment of 5% to 10%, in yet another embodiment of 6% to 8%, and in still yet another embodiment of 7%. An example of a suitable elastomer is available under the trade designation Dow Versify 2400.

Other elastomers of propylene copolymers (compatible with PP) having elasticity are appropriate as puncture resistance additives. The elastomer should exhibit a high level of attacticity (syndiotacticity or heterotacticity) consistent with low crystallinity, increased elongation, and low mass density. The elastomer may be thermoset or thermoplastic.

Other additives may be included in the core layer in amounts up to, for example, 10 wt %. An antistatic agent such as an amine may be optionally included. For example, there may be between about 50 and about 500 ppm of an amine as an antistatic agent, such as about 150 ppm. A slip agent may also be included. A slip additive is a plastics modifier that acts as a lubricant by exuding to the surface of the plastic during and immediately after processing to reduce friction between layers of film. Lower friction facilitates handling of the film and other surfaces, e.g., rollers, to which the film comes into contact. Slip additives are generally fatty materials, such as, for example, long chain fatty acids, alcohols, and amides. Preferred slip additives are fatty amides having carbon chains generally ranging from 14 to 22 carbon atoms, such as from 15 to 19 carbon atoms, including oleamide and stearic amide. For example, the core layer may include between about 150 and 500 ppm of an amide as a slip agent, such as about 250 ppm.

Accordingly, in one embodiment the core layer comprises more than 83 wt % homopolymer PP, about 15 wt % propylene-ethylene copolymer, and about 2 wt % other additives. In a currently preferred embodiment, the core layer comprises 75 to 90 wt % homopolymer of PP, 8 to 25 wt % of elastomer such as 10 to 20 wt % elastomer, 1 to 8 wt % of the antioxidant, and balance of non-polymer additives such as slip agents and anti-static agents; for example, 75 to 90 wt % homopolymer of PP, 8 to 25 wt % of elastomer such as t10 to 20 wt % elastomer, 1 to 8 wt % of the antioxidant, and no more than 5 wt % of non-polymer additives such as slip agents and anti-static agents. In an especially preferred embodiment, these are the only components of the core layer composition. For example, in one embodiment, the core layer consists of or at least consists essentially of about 80 to about 85 wt % homopolymer PP, about 10 to 20 wt % propylene-ethylene copolymer elastomer, 1 to 16 wt % of the antioxidant, such as 1 to 8 wt % or 2 to 4 wt % antioxidant, and no more than 5 wt % other components.

The core layer is much thicker than the other layers and in preferred embodiments occupies at least about 80% of the thickness of the overall multilayer film. In one embodiment, the core layer has a thickness of at least about 20 μm and up to about 45 μm, such as between about 25 and 65 μm. The overall thickness of the multilayer film in one embodiment is at least about 30 μm, such as between about 20 and about 60 μm.

The food-facing interior skin layer designated E in FIG. 1 comprises a sealable polymer blend of heat sealable polymers known in the art. This skin layer comprises one or more antioxidant compounds selected from among natural antioxidant compounds and synthetic antioxidant compounds, which are the same as described above in connection with the core layer. The one or more antioxidant compounds are incorporated into the food-facing skin layer in a total concentration of at least about 1 wt % or at least about 3 wt %, such as up to about 16 wt %, for example up to about 8 wt %, with the balance being at least about 80 wt % of the heat sealable polymers and up to 10 wt % common additives. In some preferred embodiments, the food-facing interior skin layer comprises about 8 to about 12 wt % of the antioxidant. In other preferred embodiments, it comprises about 2 to about 4 wt % antioxidant. A preferred antioxidant in this layer is vitamin C, or vitamin E, or a combination thereof.

Typically, the heat sealable polymer of the food-facing skin layer is selected from olefin copolymers, and more particularly from copolymers containing units derived from at least two of ethylene, propylene, and butene-1, and this layer comprises. Particularly preferred heat sealable polymers for the interior food-facing skin layer are propylene-ethylene copolymers and/or ethylene-propylene-butene-1 terpolymers and/or propylene-butene-1 copolymers with at least 50 wt % propylene in the copolymers and terpolymers. A currently preferred embodiment of this skin layer comprises 75 wt % propylene-butene copolymer (available from Mitsui under the Tafmer brand name), 15 wt % propylene-ethylene copolymer (Versify) to further enhance elasticity, puncture resistance, and sealing, and 10 wt % other common additives.

The exterior skin layer comprises a homogeneous polypropylene (HoPP), a copolymer polypropylene (CoPP), and/or terpolymer polypropylene (TerPP). This exterior skin layer in the currently preferred embodiment comprises more than 90 wt %, more than 95 wt %, or even more than 98 wt % of the HoPP, CoPP, and/or TerPP material. The exterior skin layer optionally includes additives to improve barrier properties, such as hydrocarbon polymer of polypropylene, polyethylene or any other polyolefin in a concentration between about 3 and about 18 wt %. The exterior skin layer may optionally be treated. That is, this layer may receive a surface treatment at some point during the overall film manufacture such as a corona treatment, chemical treatment, or flame treatment. One purpose of such treatment is to enhance bonding with a structural film which functions as a lamination substrate. Another purpose may be to improve printability.

In the embodiment shown in FIG. 1, there are also intermediate layers on each side of the core layer. The first intermediate layer is an intermediate layer on the food-facing side of the core layer and comprises a homogeneous polypropylene (HoPP), a copolymer polypropylene (CoPP), and/or terpolymer polypropylene (TerPP). This layer in the currently preferred embodiment comprises more than 80 wt %, more than 90 wt %, more than 95 wt %, or even more than 98 wt % of the HoPP, CoPP, and/or TerPP material. This intermediate layer comprises one or more antioxidant compounds selected from among natural antioxidant compounds and synthetic antioxidant compounds, which are the same as described above in connection with the core layer. The one or more antioxidant compounds are incorporated into the food-facing side intermediate layer D in FIG. 1 in a total concentration of at least about 1 wt % or at least about 4 wt %, such as up to about 16 wt %, for example up to about 8 wt %. In some preferred embodiments, the food-facing side intermediate layer comprises about 8 to about 12 wt % of the antioxidant. In other preferred embodiments, it comprises about 2 to about 4 wt % antioxidant. A preferred antioxidant in this layer is vitamin C, or vitamin E, or a combination thereof.

This food-facing side intermediate layer optionally further contains a peeling agent. In one embodiment, the peeling agent is an ethylene copolymer such as, for example, a compound selected from the group consisting of ethylene acrylic acid, ethylene methacrylate, and ethylene ethyl acrylate, and combinations thereof. Suitable peeling agents include ethylene acrylic acid copolymer available from Dow under the family name of Primacor and polypropylene-modified ethylene methacrylate available from DuPont under the family name of Appeel. The concentration of peeling agent in the peelable layer is typically between about 1 and about 80%, such as between about 5 and about 50%. In the currently preferred embodiment, peeling agent concentration is selected to achieve an initial peak peel strength of less than 450 g/inch and a subsequent continuous peel strength of less than 350 g/inch.

This food-facing side intermediate layer has a thickness of, for example, between about 0.2 and about 8 μm, for example between about 0.5 and about 6 μm.

FIG. 1 shows an optional additional intermediate layer between the core layer and the exterior skin layer. This exterior side intermediate layer in the currently preferred embodiment comprises more than 90 wt %, more than 95 wt %, or even more than 98 wt % HoPP material. The balance is optional additives, such as hydrocarbon polymer of polypropylene, polyethylene or any other polyolefins and synthetic silica in a concentration between about 7 and about 23 wt % to improve barrier properties.

This exterior side intermediate layer has a thickness of, for example, between about 0.5 and about 5 µm, for example between about 1.5 and about 3.5 µm.

The overall film of the invention is metal-free, in contrast to commercial packaging films which are metalized. The film is also transparent, in contrast to many food-packaging films designed to reduce spoilage. The film is free of BHT (butylated hydroxytoluene) and BHA (butylated hydroxyainsole). The film reduces spoilage even with foods that do not contain partially hydrogenated oils.

The following table shows base compositions for five-layer films previously disclosed in U.S. Pat. No. 9,694,564, which are of the type of film into which antioxidant compounds can be incorporated to yield films of the invention.

TABLE 1

| | X-386 | | X-387 | |
| --- | --- | --- | --- | --- |
| | Thickness, um | Compositions | Thickness, um | Compositions |
| Layer A | 2.2 | 90% C3/C4 + Additives | 2.2 | 15% C3/C2 + 75% C3/C4 + Additives |
| Layer B | 2 | 80% Ho-PP + 20% PA | 2 | 80% Ho-PP + 20% PA |
| Layer C | 63.8 | 83% Ho-PP + 15% PRA + Additives | 63.8 | 83% Ho-PP + 15% PRA + Addtives |
| Layer D | 1 | 100% Ho-PP | 1 | 100% Ho-PP |
| Layer E | 1 | 96% Ho-PP + Additives | 1 | 96% Ho-PP + Additives |
| Layer A | 2-4 | (10%-20%)C3/C2 + (50%-70%)C3/C4 + Additives | | |
| Layer B | 1-3 | (80%-90%) HoPP + (10%-20%) PA | | |
| Layer C | 30-38 | (80%-90%) HoPP + (10%-15%) PRA + Additives | | |
| Layer D | 2-4 | (90%-98%) HoPP + Additives | | |
| Layer E | 2-4 | (90%-98%) HoPP + Additives | | |

Where C3/C4 refers to propylene-butene copolymer; C3/C2 refers to propylene-ethylene copolymer; PRA refers to puncture resistance additive (elastomer); Ho-PP refers to homopolymer polypropylene; and PA refers to peeling agent.

Six food packaging films were prepared generally in accordance with the examples of U.S. Pat. No. 9,694,564, which is expressly incorporated herein by reference, with compositional changes. In each of these films, there were five layers, including an exterior skin treated layer (layer A), a core layer (layer C), an interior sealable food-facing layer (layer E), an intermediate barrier layer (layer B) between the exterior layer and the core layer, and an intermediate peelable layer (layer D) between the food-facing interior skin layer and the core layer. The control film trial 1 contained no anti-oxidant compound in any of the layers, and each of the layers was as described in Example X2B45 of 9,694,564. In addition, several embodiments of the invention were prepared, trials 2-6, containing varying amounts of a first antioxidant vitamin C (AO1) and a second antioxidant vitamin E (AO2) in layers C, D, and E. Formulations 2, 3, 5 and 6 produced workable films. Formulation 4 did not. Formulations 5 and 6 were evaluated further and demonstrated an effective shelf life of at least seven months.

TABLE 2

| | ANTIOXIDANT ADDITIONS TO BASE COMPOSITION | | | | |
| --- | --- | --- | --- | --- | --- |
| Trial | Layer A 1.5-6 µm thickness | Layer B 2-8 µm thickness | Layer C 30-50 µm thickness | Layer D 0.1-2.7 µm thickness | Layer E 0.9-7 µm thickness |
| 1 (control) | | | | | |
| 2 | | | 1-5% AO1 | 4-16% AO1 | 4-16% AO1 |
| 3 | | | 1-5% AO2 | 4-16% AO2 | 4-16% AO2 |
| 4 | | | 1-5% AO2 | 10-30% AO1 10-30% AO2 | 3-10% AO2 |
| 5 | | | 1-5% AO2 | 1-5% AO2 | 1-5% AO2 |
| 6 | | | 0.1-3% AO1 1-5% AO2 | 1-5% AO2 | 1-5% AO2 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A food packaging film comprising:
   a polymer-based core layer having a food-facing side and an exterior-facing side;
   a food-facing skin layer on the food-facing side of the core layer; and
   an exterior skin layer on the exterior-facing side of the core layer;
   wherein the core layer and the food-facing skin layer are free of BHT (butylated hydroxytoluene) and BHA (butylated hydroxyainsole), and each contains an antioxidant selected from among green tea, rosemary oil, and combinations thereof; and
   wherein the core layer comprises between 2 and 4 wt % of the antioxidant and the food-facing skin layer comprises between 8 and 12 wt % of the antioxidant.

2. The food packaging film of claim 1 wherein the food-facing layer is a sealable layer and the exterior skin layer is a treated layer.

3. The food packaging film of claim 1 wherein the film further comprises:
   a first intermediate layer between the food-facing interior skin layer and the core layer, wherein the first intermediate layer contains a natural or synthetic antioxidant compound; and
   a second intermediate layer between the exterior skin layer and the core layer.

4. The food packaging film of claim 3 wherein the first intermediate layer is a barrier layer and the second intermediate layer is a peelable layer.

5. The food packaging film of claim 3 wherein the antioxidant in the first intermediate layer between the food-facing interior skin layer and the core layer is selected from among vitamin E, Epigallocatechin gallate, Epigallocatechin-3-gallate, Epicatechi-3-gallate, ascorbic acid, fatty acid ester of ascorbic acid, alpha-tocopherol, gamma-tocopherol, delta-tocopherol, rosemary oil, vitamin C, ascorbyl palmitate, and combinations thereof.

6. The food packaging film of claim 5 wherein first intermediate layer comprises between 2 and 4 wt % of the antioxidant.

7. The food packaging film of claim 5 wherein the first intermediate layer comprises between 8 and 12 wt % of the antioxidant.

8. The food packaging film of claim 1 wherein:
   the core layer comprises 75 to 90 wt % homopolymer of PP and 10 to 20 wt % elastomer;
   the food-facing skin layer comprises at least about 80 wt % heat-sealable polymers derived from at least two of ethylene, propylene, and butene 1; and
   the exterior skin layer comprises more than 90 wt % of a polypropylene selected from homopolymer polypropylene (HoPP), a copolymer polypropylene (CoPP), terpolymer polypropylene (TerPP), and combinations thereof.

9. The food packaging film of claim 5 wherein:
   the core layer comprises 75 to 90 wt % homopolymer of PP and 10 to 20 wt % elastomer;
   the food-facing skin layer comprises at least about 80 wt % heat-sealable polymers derived from at least two of ethylene, propylene, and butene 1;
   the first intermediate layer comprises more than 80 wt % of a polypropylene selected from homopolymer polypropylene (HoPP), a copolymer polypropylene (CoPP), terpolymer polypropylene (TerPP), and combinations thereof, and from 1 to 16 wt % of the antioxidant;
   the exterior skin layer comprises more than 90 wt % of a polypropylene selected from homogeneous polypropylene (HoPP), a copolymer polypropylene (CoPP), terpolymer polypropylene (TerPP), and combinations thereof.

10. The food packaging film of claim 9 wherein the first intermediate layer comprises 2 to 4 wt % antioxidant selected from among vitamin C, vitamin E, and combinations thereof.

11. The food packaging film of claim 9 wherein the first intermediate layer comprises 8 to 12 wt % antioxidant selected from among vitamin C, vitamin E, and combinations thereof.

12. The food packaging film of claim 1 consisting of five layers:
   said core layer, wherein the core layer has a thickness between 30 and 40 µm and comprises 75 to 90 wt % homopolymer of PP and 10 to 20 wt % elastomer;
   said food-facing skin layer, wherein the food-facing skin layer has a thickness between 0.9 and 7 µm and comprises at least about 80 wt % heat-sealable polymers derived from at least two of ethylene, propylene, and butene 1;
   said exterior skin layer, wherein the exterior skin layer has a thickness between 1.5 and 6 µm and comprises more than 90 wt % of a polypropylene selected from a homogeneous polypropylene (HoPP), a copolymer polypropylene (CoPP), a terpolymer polypropylene (TerPP), and combinations thereof;
   a first intermediate layer which is between the food-facing skin layer and the core layer, has a thickness between 0.1 and 2.7 µm, and comprises more than 80 wt % of a polypropylene selected from a homogeneous polypropylene (HoPP), a copolymer polypropylene (CoPP), a terpolymer polypropylene (TerPP), and combinations thereof, and from 8 to 12 wt % vitamin C; and
   a second intermediate layer which is between the exterior skin layer and the core layer, has a thickness between 2 and 8 µm, and comprises 80 to 90 wt % homopolymer polypropylene (HoPP) and 10 to 20 wt % peeling agent.

13. The food packaging film of claim 1 consisting of five layers:
   said core layer, wherein the core layer has a thickness between 30 and 40 µm and comprises 75 to 90 wt % homopolymer of PP and 10 to 20 wt % elastomer;
   said food-facing skin layer, wherein the food-facing skin layer has a thickness between 0.9 and 7 µm and comprises at least about 80 wt heat-sealable polymers derived from at least two of ethylene, propylene, and butene 1;
   said exterior skin layer, wherein the exterior skin layer has a thickness between 1.5 and 6 µm and comprises more than 90 wt % of a polypropylene selected from a homogeneous polypropylene (HoPP), a copolymer polypropylene (CoPP), a terpolymer polypropylene (TerPP), and combinations thereof;

a first intermediate layer which is between the food-facing skin layer and the core layer, has a thickness between 0.1 and 2.7 μm, and comprises more than 80 wt % of a polypropylene selected from a homogeneous polypropylene (HoPP), a copolymer polypropylene (CoPP), a terpolymer polypropylene (TerPP), and combinations thereof, and from 8 to 12 wt % vitamin E; and a second intermediate layer which is between the exterior skin layer and the core layer, has a thickness between 2 and 8 μm, and comprises 80 to 90 wt % % homopolymer polypropylene (HoPP) and 10 to 20 wt % peeling agent.

14. The food packaging film of claim 1 consisting of five layers:
said core layer, wherein the core layer has a thickness between 30 and 40 μm and comprises 75 to 90 wt % homopolymer of PP and 10 to 20 wt % elastomer antioxidant;
said food-facing skin layer, wherein the food-facing skin layer has a thickness between 0.9 and 7 μm and comprises at least about 80 wt % heat-sealable polymers derived from at least two of ethylene, propylene, and butene-1;
said exterior skin layer, wherein the exterior skin layer has a thickness between 1.5 and 6 μm and comprises more than 90 wt % of a polypropylene selected from a homogeneous polypropylene (HoPP), a copolymer polypropylene (CoPP), a terpolymer polypropylene (TerPP), and combinations thereof;
a first intermediate layer which is between the food-facing skin layer and the core layer, has a thickness between 0.1 and 2.7 μm, and comprises more than 80 wt % of a polypropylene selected from a homogeneous polypropylene (HoPP), a copolymer polypropylene (CoPP), a terpolymer polypropylene (TerPP), and combinations thereof, and from 2 to 4 wt % vitamin E; and
a second intermediate layer which is between the exterior skin layer and the core layer, has a thickness between 2 and 8 μm, and comprises 80 to 90 wt % % homopolymer polypropylene (HoPP) and 10 to 20 wt % peeling agent.

15. The food packaging film of claim 1 consisting of five layers:
said core layer, wherein the core layer has a thickness between 30 and 40 μm and comprises 75 to 90 wt % homopolymer of PP, 10 to 20 wt % elastomer, and 2 to 4 wt % vitamin E;
said food-facing skin layer, wherein the food-facing skin layer has a thickness between 0.9 and 7 μm and comprises at least about 80 wt % heat-sealable polymers derived from at least two of ethylene, propylene, and butene 1;
said exterior skin layer, wherein the exterior skin layer has a thickness between 1.5 and 6 μm and comprises more than 90 wt % of a polypropylene selected from a homogeneous polypropylene (HoPP), a copolymer polypropylene (CoPP), a terpolymer polypropylene (TerPP), and combinations thereof;
a first intermediate layer which is between the food-facing skin layer and the core layer, has a thickness between 0.1 and 2.7 μm, and comprises more than 80 wt % of a polypropylene selected from a homogeneous polypropylene (HoPP), a copolymer polypropylene (CoPP), a terpolymer polypropylene (TerPP), and combinations thereof, and from 2 to 4 wt % vitamin E; and
a second intermediate layer which is between the exterior skin layer and the core layer, has a thickness between 2 and 8 μm, and comprises 80 to 90 wt % % homopolymer polypropylene (HoPP) and 10 to 20 wt % peeling agent.

16. The food packaging film of claim 1, further comprising an intermediate layer which is between the food-facing skin layer and the core layer, the intermediate layer comprising 4-16 wt % antioxidant.

17. The food packaging film of claim 1, further comprising an intermediate layer which is between the food-facing skin layer and the core layer, the intermediate layer comprising 10-30 wt % antioxidant.

* * * * *